US009646570B2

(12) United States Patent
Taylor et al.

(10) Patent No.: US 9,646,570 B2
(45) Date of Patent: May 9, 2017

(54) MECHANISM FOR FACILITATING IMPROVED COPYING OF GRAPHICS DATA ON COMPUTING DEVICES

(71) Applicants: Robert B. Taylor, Hillsboro, OR (US); Anupama Chandrasekhar, San Jose, CA (US); John H. Feit, Folsom, CA (US)

(72) Inventors: Robert B. Taylor, Hillsboro, OR (US); Anupama Chandrasekhar, San Jose, CA (US); John H. Feit, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 14/296,028

(22) Filed: Jun. 4, 2014

(65) Prior Publication Data
US 2015/0356768 A1  Dec. 10, 2015

(51) Int. Cl.
| | |
|---|---|
| *G06T 19/00* | (2011.01) |
| *G09G 5/39* | (2006.01) |
| *G09G 5/393* | (2006.01) |
| *G09G 5/399* | (2006.01) |
| *G06T 15/04* | (2011.01) |
| *G09G 5/36* | (2006.01) |
| *G06T 1/60* | (2006.01) |
| *G06T 15/00* | (2011.01) |
| *G09G 5/395* | (2006.01) |

(52) U.S. Cl.
CPC ............... *G09G 5/363* (2013.01); *G06T 1/60* (2013.01); *G06T 15/005* (2013.01); *G09G 5/393* (2013.01); *G09G 5/395* (2013.01); *G06T 2200/04* (2013.01); *G06T 2200/28* (2013.01); *G09G 2340/0407* (2013.01); *G09G 2360/127* (2013.01); *G09G 2360/18* (2013.01)

(58) Field of Classification Search
CPC ........... G06T 19/00; G06T 15/04; G09G 5/02; G09G 5/39; G09G 5/393; G09G 5/399; G06F 12/0607; G06F 13/28; H04L 49/90
USPC ....... 345/419, 582, 605, 536, 537, 538, 544, 345/552
See application file for complete search history.

(56) References Cited

U.S. PATENT DOCUMENTS

| | | | |
|---|---|---|---|
| 2004/0078499 A1* | 4/2004 | Karaorman | ............. G06F 9/542 710/22 |
| 2004/0263526 A1* | 12/2004 | Poddar | .................. G06T 11/001 345/582 |

\* cited by examiner

*Primary Examiner* — Ke Xiao
*Assistant Examiner* — Andrew Shin
(74) *Attorney, Agent, or Firm* — Blakely, Sokoloff, Taylor & Zafman LLP

(57) ABSTRACT

A mechanism is described for facilitating improved copying of graphics data at computing devices according to one embodiment. A method of embodiments, as described herein, includes detecting a first data having a first set of primitives at a one-dimensional ("1D") source buffer. The first data is detected to be copied to a 1D destination buffer. The method may further include re-describing the 1D source buffer and the 1D destination buffer into a two-dimensional ("2D") source buffer and a 2D destination buffer, respectively, where re-describing may include re-describing the first data having the first set of primitives to a second data having a second set of primitives. The method may further include copying the second data having the second set of primitives from the 2D source buffer to the 2D destination buffer.

22 Claims, 11 Drawing Sheets

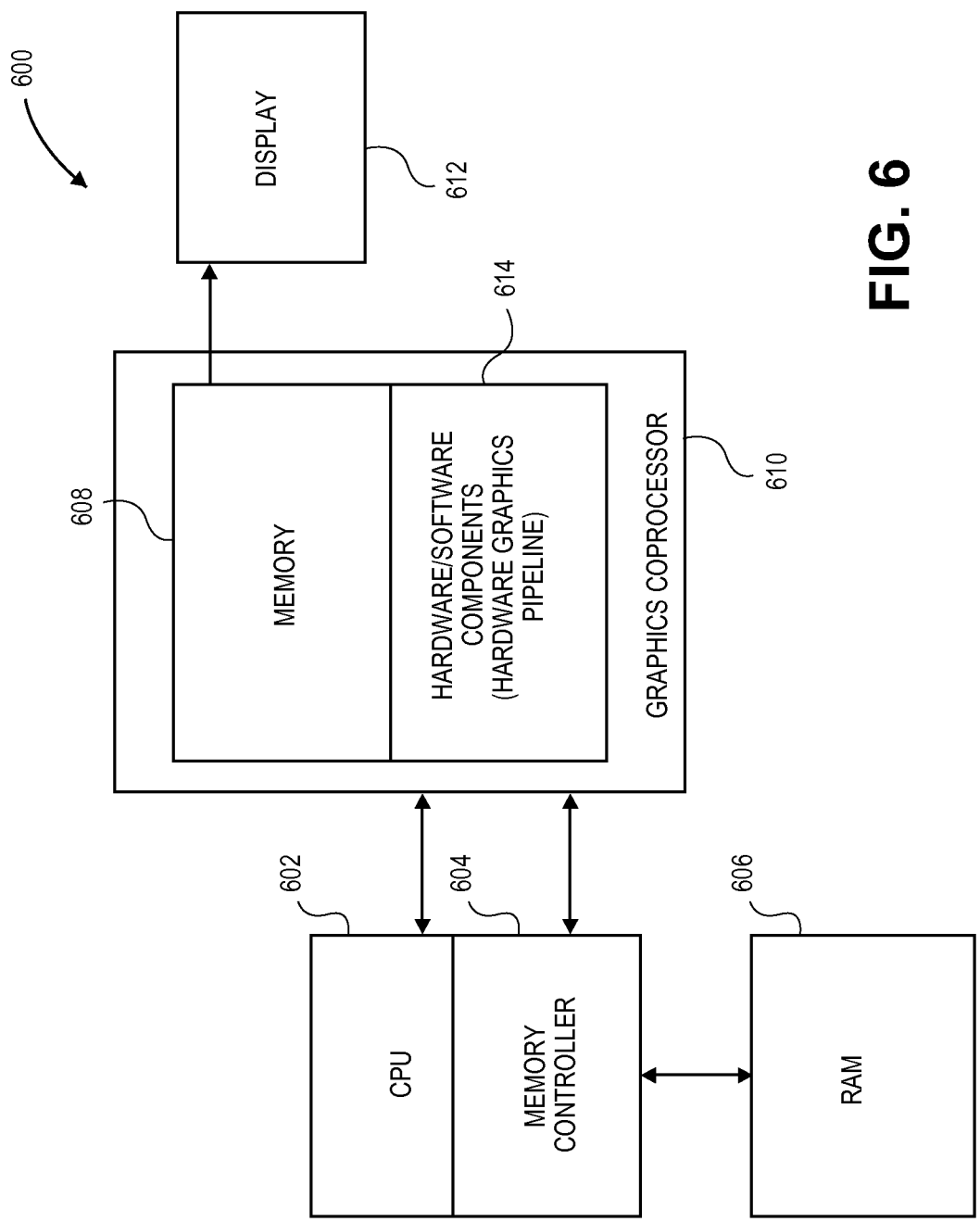

MECHANISM FOR FACILITATING IMPROVED COPYING OF GRAPHICS DATA ON COMPUTING DEVICES

FIELD

Embodiments described herein generally relate to computers. More particularly, embodiments relate to a mechanism for facilitating improved copying of graphics data on computing devices.

BACKGROUND

Conventional graphics data copying techniques are handicapped by the limitations or restrictions of graphics hardware, such as when relying upon a three-dimensional (3D) graphics pipeline to copy one-dimensional (1D), two-dimensional (2D), and 3D memory regions from a system or video source to a destination in system or video memory. Such conventional techniques can be severely inefficient with regard to the use and waste of time, power, cache, etc., as they require running of a large number of processes and computations to perform the necessary copying tasks.

BRIEF DESCRIPTION OF THE DRAWINGS

Embodiments are illustrated by way of example, and not by way of limitation, in the figures of the accompanying drawings in which like reference numerals refer to similar elements.

FIG. 6 illustrates computer system suitable for implementing embodiments of the present disclosure according to one embodiment.

DETAILED DESCRIPTION

Figure 1:
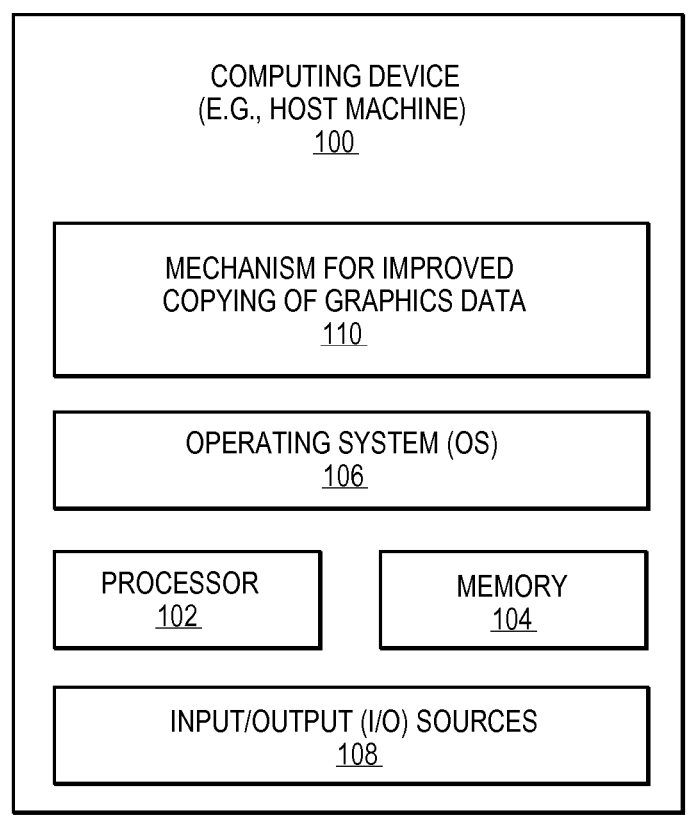
FIG. 1 illustrates a mechanism for improved copying of graphics data according to one embodiment.

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a number of techniques for overcoming any number and type of conventional challenges by lowering the computation time, power usage, cache usage and other memory requirements, etc., by, for example, reducing the number of programs that are typically needed to run to achieve various copying tasks. For example, embodiments provide for re-describing 1D source/destination buffers or resources to 2D source/destination buffers or resources to efficiently increase the single-pass number of texels that are moved per primitive submitted for copying as described with reference to FIGS. 3A-3B. A texel (also referred to as "texture element" or "texture pixel") is a fundamental unit of texture space used in computer graphics, where textures may be represented by arrays of texels. A texel may include one or more bytes of data. For example, when performing texture mapping, such as texturing one or more 3D surfaces, texels are mapped to relevant pixels in an output picture using a rendering process via a graphics processing unit (GPU).

Embodiments also provide for re-describing a texel width of a given texture to a particular threshold bits format, such as a 128 bits per pixel ("bpp") format, to generate bigger but fewer texels for copying of data as described with reference to FIGS. 4A-4D. Embodiments further provide for using a specialized shader to re-order data reads for unaligned copies such that it can be written out in a higher bpp format and further provide for forcing an alignment of a destination render target to align with a hardware cache as will be further described with reference to FIGS. 5A-5D.

Embodiments further provide for re-description of copies to a higher bpp than the native bpp with which a resource was created. Further, a specialized shader may effectively shift or source data and swizzle it to perform a higher bpp copy when the source and destination are not byte-aligned with each other. A shader, for example, may refer to a computer program or algorithm that executes on a processor, such as a GPU. Aligning the destination or source resources may be performed prior to executing a copy to reduce cache penalty for otherwise unaligned data, which may be seen in a direct memory access ("DMA") engine as well as in a 3D one. It is contemplated that these novel techniques for copying data may be applied using any number and type of application programming interfaces ("APIs"), programming languages, frameworks, etc., such as (but not limited to) Open Graphics Library ("OpenGL"), Open Computing Language ("OpenCL"), Dx9, Dx10, Dx11, etc.

As aforementioned, constraints in graphics hardware may limit one or more processes, such as number of threads spawned for shading, number of in-flight sampler messages, number of texels sampled, color writes per clock, etc. A copy operation may be implemented by shading a 3D primitive in the region to be copied, sampling from the source memory, and writing out the color for the destination. In one embodiment, when the copy operation is a direct copy, such as no shape transformation or format conversion is performed, the source and destination memory may be re-described in alternate memory layouts to achieve significant improvements to performance and reduction to power by, for example, reducing the number of texels sampled, color writes, and shader threads, etc., to perform the equivalent copy operation.

Further, a direct copy operation implemented in 3D may be limited by the dimensions of a copy rectangle and native format for the resource. For example, a full surface copy operation from a 256×256-R8G8B8A8 surface to another 256×256-R8G8B8A8 surface may include the following properties when copied in the 3D pipeline: (1) 4 bytes are copied per shaded pixel; (2) 4096 SIMD16 threads are spawned to perform the copy; (3) 8192 sampler messages are sent to fetch the source data; and (4) 65536 color writes occur to update the destination. Given that the aforementioned hardware restrictions may limit this sort of copying performance due to the above properties, an equivalent copy operation may be achieved by, in one embodiment, re-describing the memory region to increase the amount of data copied per thread. Using the above example, re-describing the memory region from 256×256-R8G8B8A8 to 64×256-R32G32B32A32 addresses the performance limitations by, for example, reducing the limiting properties by a factor of, for example, 4 and increasing the data copied per pixel. This technique allows for an increase in the data copied per pixel and decrease in the overall dimensions of the copy rectangle which reduces, for example, the number of threads spawned, sampler messages dispatched, and color writes for the copy operation, etc.

Figure 2:
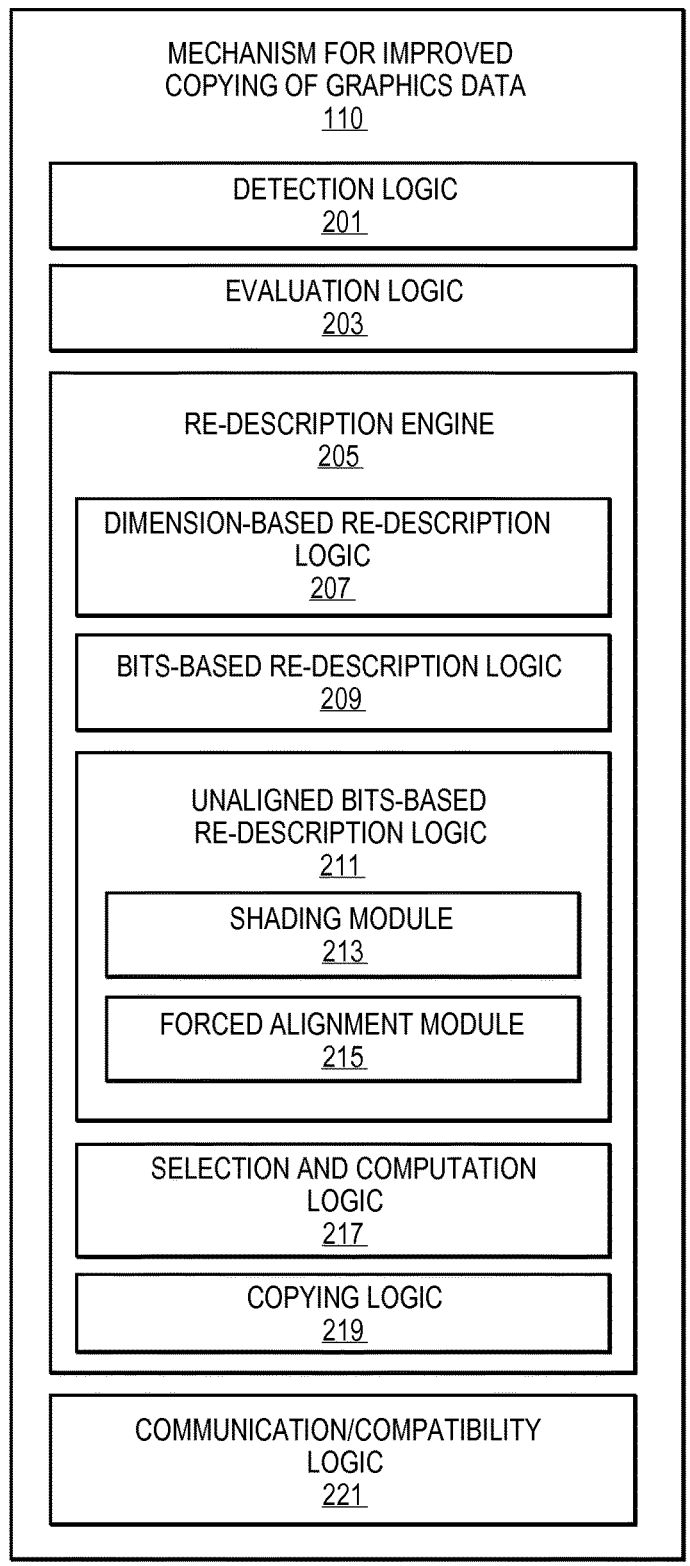
FIG. 2 illustrates a mechanism for improved copying of graphics data according to one embodiment.

FIG. 1 illustrates a mechanism for improved copying of graphics data 110 according to one embodiment. Computing device 100 serves as a host machine for hosting mechanism for improved copying of graphics data ("copying mechanism") 110 that includes any number and type of components, as illustrated in FIG. 2, to efficiently perform various copying tasks of graphics data as will be further described throughout this document.

Computing device 100 may include any number and type of communication devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™ system, etc.), e-readers (e.g., Kindle® by Amazon®, Nook® by Barnes and Nobles®, etc.), smart televisions, television platforms, wearable devices (e.g., watch, bracelet, smartcard, jewelry, clothing items, etc.), media players, etc.

Computing device 100 may include an operating system (OS) 106 serving as an interface between hardware and/or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Similarly, it is to be noted that embodiments are not limited to merely "copying" of data and that the term "copying" is primarily used as an example for brevity, clarity, and ease of understanding. Embodiments may also be used for other purposes, such as "moving" or "transferring" of data, but for brevity and clarity, "copying" may be used interchangeably with "moving" and "transferring", and the like, throughout this document.

FIG. 2 illustrates a mechanism for improved copying of graphics data 110 according to one embodiment. In one embodiment, a computing device, such as computing device 100 of FIG. 1 may serve as a host machine for hosting mechanism for improved copying of graphics data ("copying mechanism") 110 and that includes any number and type of components, such as: detection logic 201; evaluation logic 203; re-description engine 205 including dimension-based re-description logic ("dimension-based logic") 207, bits-based re-description logic ("bits-based logic") 209, and unaligned bits-based re-description logic ("unaligned bits-based logic") 211 having shading module 213 and force alignment module 215, selection and computation logic 217, and copying/moving logic 219; and communication/compatibility logic 221.

In one embodiment, detection logic 201 is triggered when a set of data is to be copied from an address at a source (e.g., video source, such as a source memory location relating to a GPU or a central processing unit (CPU)) to an address at a destination (e.g., video destination, such as a destination memory location relating to a GPU or a CPU). For example, detection logic 201 may detect a job request to copy data from the source to the destination and upon detecting the request for potential copying of the data, detection logic 201 may further detect the placement of the source and destination addresses to each other as well as the hardware cache (such as to determine the alignment or lack thereof) and further detect the amount of data (e.g., number of bytes, texels, primitives, etc.) that is to be copied. Any information detected by detection logic 201 may then be sent from detection logic 201 to evaluation logic 203 for further processing.

In one embodiment, at evaluation logic 203, the detected information may be analyzed or evaluated so that an appropriate process may be chosen for copying of the data. For example and in one embodiment, evaluation logic 203 may be used to evaluate whether the two addresses aligned (or unaligned) with each other or whether one or more portions (where each portion includes any number of bytes, etc.) of the data may be designated as a head primitive and/or a tail primitive and copied to the destination as such. Similarly, evaluation logic 203 may also be used to determine the actual size and number of primitives or texels and accordingly, divide the data in any number of portions to be designated and treated as primitives or texels. A primitive, in graphics, may refer to a basic element, such as a line, a curve, a polygon, etc., which may be combined with other primitives to form more complex graphical images. Further, a primitive may be of any size, such as include any number of bytes of data. Once the evaluation of the data has been performed by evaluation logic 203, the process may then be forwarded on to one or more of dimension-based logic 207, bits-based logic 209, and unaligned bits-based logic 211 of re-description engine 205 as determined by evaluation logic 203.

For example and in some embodiments, as will be further described with reference to FIGS. 3A-3B, dimension-based logic 207 may be used to re-describe the 1D source and destination buffers as 2D source and destination buffers to seamlessly and dynamically create a larger primitives while staying true to the given parameters of the hardware constraints. This way, without having to violate the hardware constraints, the same amount of data (or even more data) may be copied from a 2D source buffer to a 2D destination having consumed significantly lower amount of resources than would have been required by the 1D source/destination buffers. For example, if a maximum primitive allowed by the hardware is that of a 1×N dimension and, suppose, N is 10 texels, to copy 1D resource of 40 texels, 4 passes of 1×10 would be needed.

However, in one embodiment, re-describing the buffers from 1D to 2D, the same amount of data may be copied using merely a single primitive. It is contemplated that the real-life limit of N may be much higher than merely 10 texels and therefore, embodiments provide for a much larger relief from conventional bottlenecking of software and/or hardware due to various factors, such as CPU cost of setting up the state per primitive, GPU cost of executing several smaller primitives instead of a single large one, etc. Further, it is contemplated that embodiments are not merely limited to 1D-2D re-description and that other re-description may also be performed, such as 1D to 3D, 2D to 3D, 3D to 2D, or any combination thereof.

In some embodiments, if the native bpp is less or greater than a particular threshold bpp value, such as native 32 bpp is less than threshold 128 bpp, and the source and destination addresses are determined to be aligned, the process may be forwarded by evaluation logic 203 to bits-based logic 209 to facilitate data copying from, for example, an aligned 128 bpp address at the source to another 128 bpp address at the destination as will be further described with reference to FIGS. 4A-4D. Further, in another embodiment, if the source and destination are aligned to each other, but not to the threshold bpp value, such as 128 bpp, a primitive may be executed to perform any necessary head and/or tail alignments at native bpp to be copied separately.

In some embodiments, as will be further described with reference to FIGS. 5A-5D, in those cases that do not update the entire resource (which in turn may vary byte alignments for source and destination surfaces), the process may be forwarded on to unaligned bits-based logic 211 for performing re-description of bpp values and texels, shading of texels, alignment of addresses in hardware cache, and copying of data in a manner different from the way performed by bits-based logic 209 such that the copying is not restricted to merely the aligned source and destination surfaces. As will be further illustrated with reference to FIG. 5C, shading module 213 may be used as a shader to facilitate shading of texels to be copied to the destination surface, while force alignment module 215 may be used to facilitate an alignment of the source and destination addresses for seamless and dynamic copying of the data.

In one embodiment, re-description engine 205 may further include selection and computation logic 217 may work with evaluation logic 203 for performing various computation and selection tasks, such as computing one or more portions of data to designated as primitives, heads, tails, etc., and then selecting them to be forwarded on to copying logic 219 for performing the various copying tasks, such as copying the selected data from the source to the destination. Further, for example, selection and computation logic 217 may be used for computing and/or defining the size of primitives or heads or tails, such as how many bytes or texels may constitute a primitive or a head or a tail, etc., and similarly, how bytes may constitute a native texels or how many native texels may constitute a re-described texels, etc.

Communication/compatibility logic 221 may be used to facilitate dynamic communication and compatibility between computing device 100 and any number and type of other computing devices (such as a mobile computing device, a desktop computer, a server computing device, etc.), processing devices (such as GPUs, CPUs), memory or storage devices, databases and/or data sources (such as data storage devices, hard drives, solid-state drives, hard disks, memory cards or devices, memory circuits, etc.), networks (e.g., cloud network, the Internet, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, such as Facebook®, LinkedIn®, Google+®, Twitter®, etc., business applications, games and other entertainment applications, etc.), programming languages, etc., while ensuring compatibility with changing technologies, parameters, protocols, standards, etc.

Throughout this document, terms like "logic", "component", "module", "framework", "engine", "point", and the like, may be referenced interchangeably and include, by way of example, software, hardware, and/or any combination of software and hardware, such as firmware. Further, any use of a particular brand, word, term, phrase, name, and/or acronym, such as "GPU", "CPU", "copying", "moving", "primitive", "re-description", "dimension", "1D", "2D", "3D", "bit", "byte", "aligned", "unaligned", etc., should not be read to limit embodiments to software or devices that carry that label in products or in literature external to this document.

It is contemplated that any number and type of components may be added to and/or removed from copying mechanism 110 to facilitate various embodiments including adding, removing, and/or enhancing certain features. For brevity, clarity, and ease of understanding of copying mechanism 110, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3A:
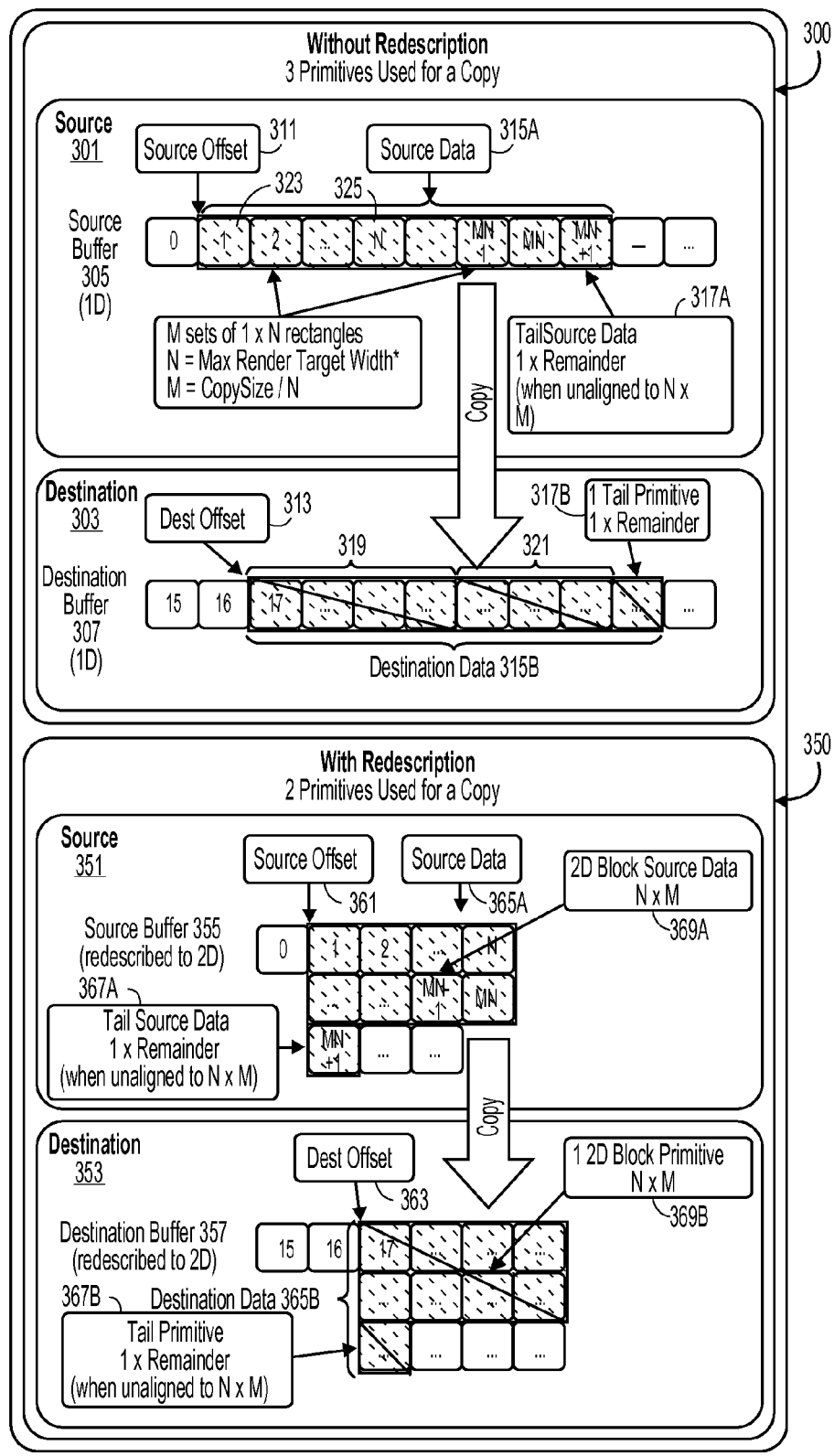
FIG. 3A illustrates copying of data as facilitated by mechanism for improved copying of graphics data of FIG. 1 according to one embodiment.

FIG. 3A illustrates copying of data as facilitated by mechanism for improved copying of graphics data 110 of FIG. 1 according to one embodiment. As discussed above, in one embodiment, dimension-based re-description technique 350 may be applied, such as re-describing 1D buffers 305, 307 to 2D buffers 355, 357, to copy source data 365A from source buffer 355 at source offset 361 as destination data 365B at destination buffer 357 at destination offset 363 as facilitated by dimension-based re-description logic 207 and other components of re-description engine 205 and copying mechanism 110 of FIG. 2.

As illustrated, using without/re-description technique 300, source data 315A at 1D source buffer 305 at source offset 311 is copied as destination data 315B at 1D destination buffer 307 at destination offset 313. For example, if the graphics hardware constraint is 1–N, such as from byte 1 323 at source offset 311 through byte N 325, without/re-description technique 300 would be limited in allowing for a maximum of 1–N bytes 323 through 325 to be formed as a primitive in a 1D setup of without/re-description technique 300. Accordingly, using the illustrated example, without/re-description technique 300 requires that source data 315A be copied as destination data 315B in three primitives 319, 321, 317B (each primitive 319, 321, 317B is further indicated by a diagonal line running across it), where primitive 317B is a destination tail representing the reminder of data 315A, 315B and corresponding to source tail 317A.

Referring now to with/re-description technique 350, in one embodiment, as 1D source buffer 305 and 1D destination buffer 307 are re-described as 2D source buffer 355 and 2D destination buffer 357, respectively. As illustrated and in one embodiment, having re-described 2D source and destination buffers 355, 357, source data 365A may also be re-described in 2D. For example, using with/re-description technique 350, the same 1D source data 315A may now be available as 2D source data 365A for efficient processing and improved copying. Continuing with the example, considering the hardware restriction may still be 1–N, but now having source data 365A in 2D (e.g., having two layers of data 265A as opposed to one layer of data 315A), an entire two-layered 2D source data 365A may be regarded as a single block of data, such as 2D block source data 369A, which may then be copied to 2D destination buffer 357 as merely a single primitive (again, further indicated by a single diagonal line across it), such as 2D block primitive 369B. For any of the remaining data, in one embodiment, source tail 367A may be generated and separately copied to 2D destination buffer 357 as destination tail 367B in the form of a single primitive.

Stated differently, when without/re-description technique 300 is converted into with/description technique 350, the same amount of data may be copied with a significantly reduced number of primitives, such as reduced by 33% in this illustration from 3 primitives 319, 321, 317B to merely 3 primitives 369B, 367B, while complying with same level of hardware restrictions. It is contemplated that in actual graphics processing and copying of data, both the data and the corresponding primitives are expected to be of a rather large number and accordingly, any percentage of reduction in primitives is going to result in a far more efficient processing and improve copying of data, saving valuable computation time as well as other resources, such as power, cache, etc.

Figure 3B:
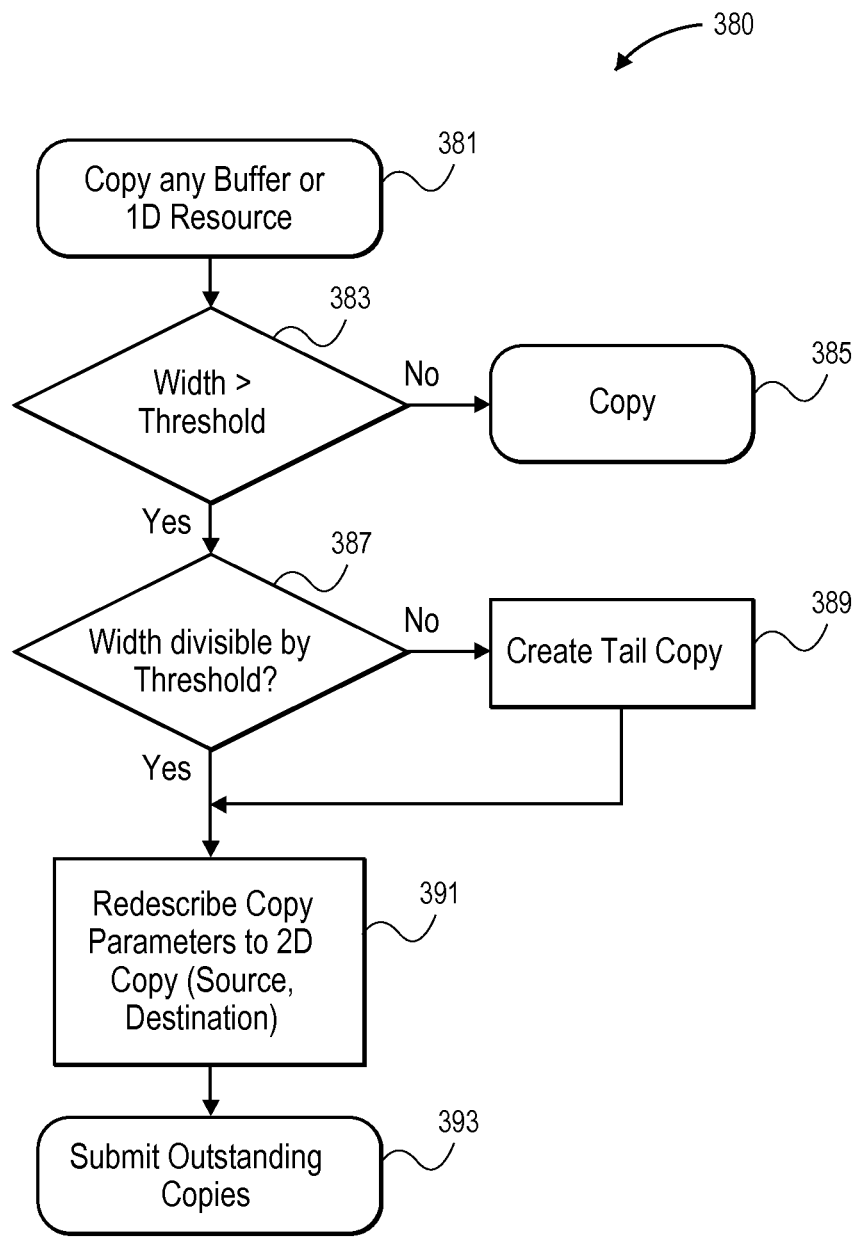
FIG. 3B illustrates a method for facilitating copying of data as illustrated in FIG. 3A using a mechanism for improved copying of graphics data of FIG. 1 according to one embodiment.

FIG. 3B illustrates a method 380 for facilitating copying of data as illustrated in FIG. 3A using a mechanism for improved copying of graphics data 110 of FIG. 1 according to one embodiment. Method 380 may be performed by processing logic that may comprise hardware (e.g., circuitry, dedicated logic, programmable logic, etc.), software (such as instructions run on a processing device), or a combination thereof. In one embodiment, method 380 may be performed by copying mechanism 110 of FIG. 1. The processes of method 380 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

Method 380 begins at block 381 with detecting and copying of a 1D data buffer or resource. At block 383, in one embodiment, a determination is made as to whether the width of the 1D buffer is larger than a width threshold, where the threshold may be a predetermined minimum and/or maximum size/width of a buffer and/or an amount of data being held by the buffer. For example and in some embodiments, a threshold may be used for determining whether the width of a 1D buffer is small enough that its data can be efficiently copied without having to re-describe its dimensions or whether it is large enough to be divided by the threshold and its dimension re-described (e.g., 1D to 2D) as illustrated with reference to FIG. 3A.

Referring back to block 383, if the width of the 1D buffer is not greater than the threshold, the data may be normally copied (e.g., without having to change buffer dimensions) at block 385. However, if the width is greater than the threshold, in one embodiment, at block 387, another determination is made as to whether the width is divisible by the threshold such that no remainder from the data is left. At block 389, if the width is not divisional by the threshold, a tail is created from the remainder (indivisible) data at the source so it may then be copied as a destination tail to a corresponding address at the destination. In one embodiment, if the width is divisible by the threshold, the process of block 389 may be skipped and continues at block 391 where the 1D source and destination buffers are re-described as 2D source and destination buffers as illustrated with reference to FIG. 3A. The data from the re-described 2D source buffer is then copied to the 2D destination buffer at block 393.

Figure 4A:
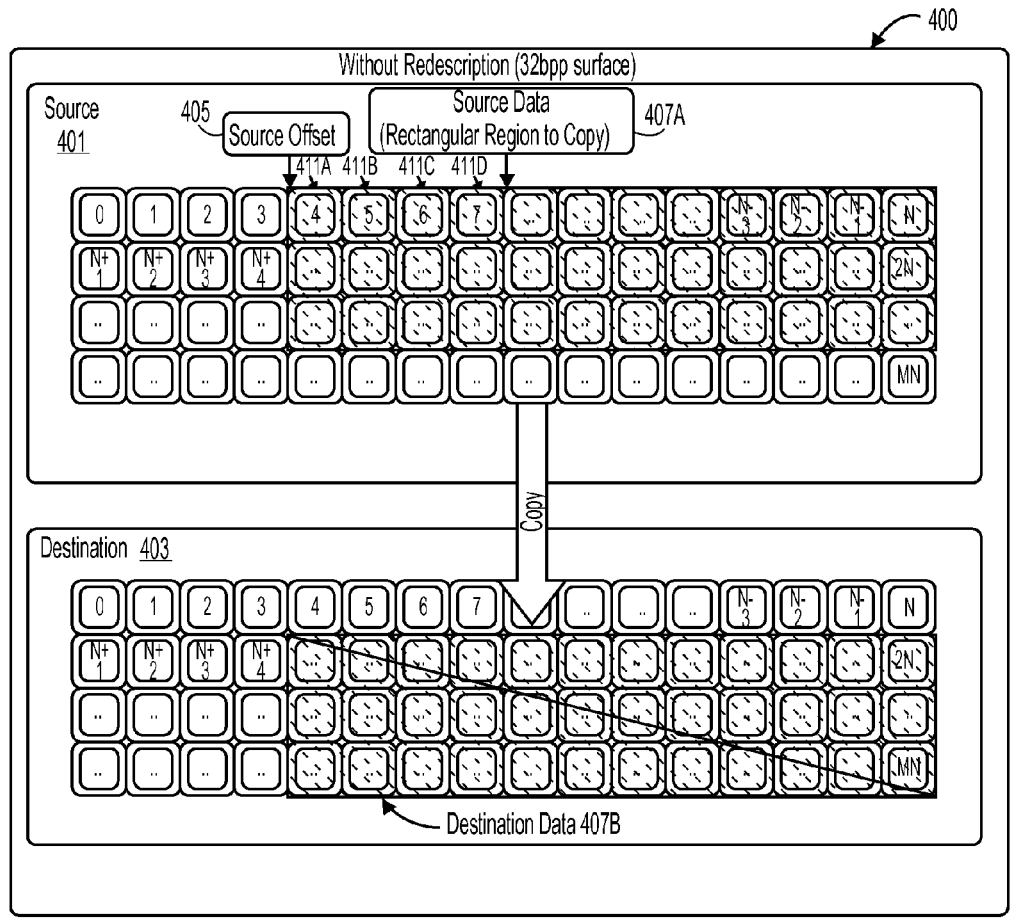
FIGS. 4A-4C illustrate copying of data as facilitated by a mechanism for improved copying of graphics data of FIG. 1 according to one embodiment.
Figure 4B:
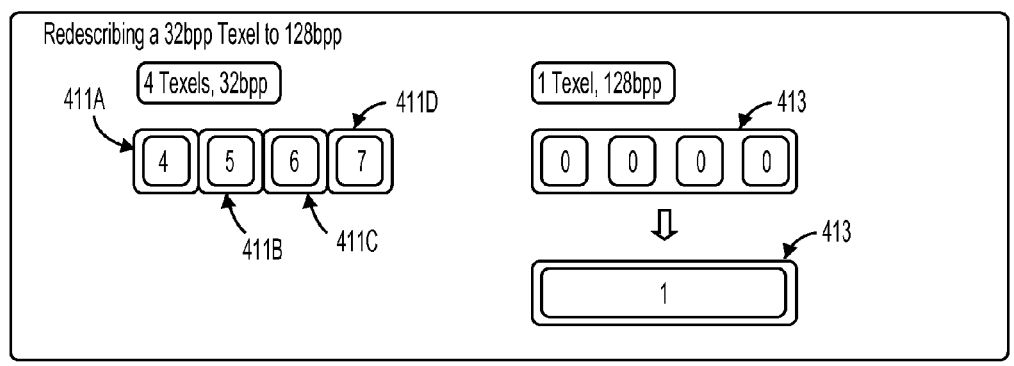
Figure 4C:
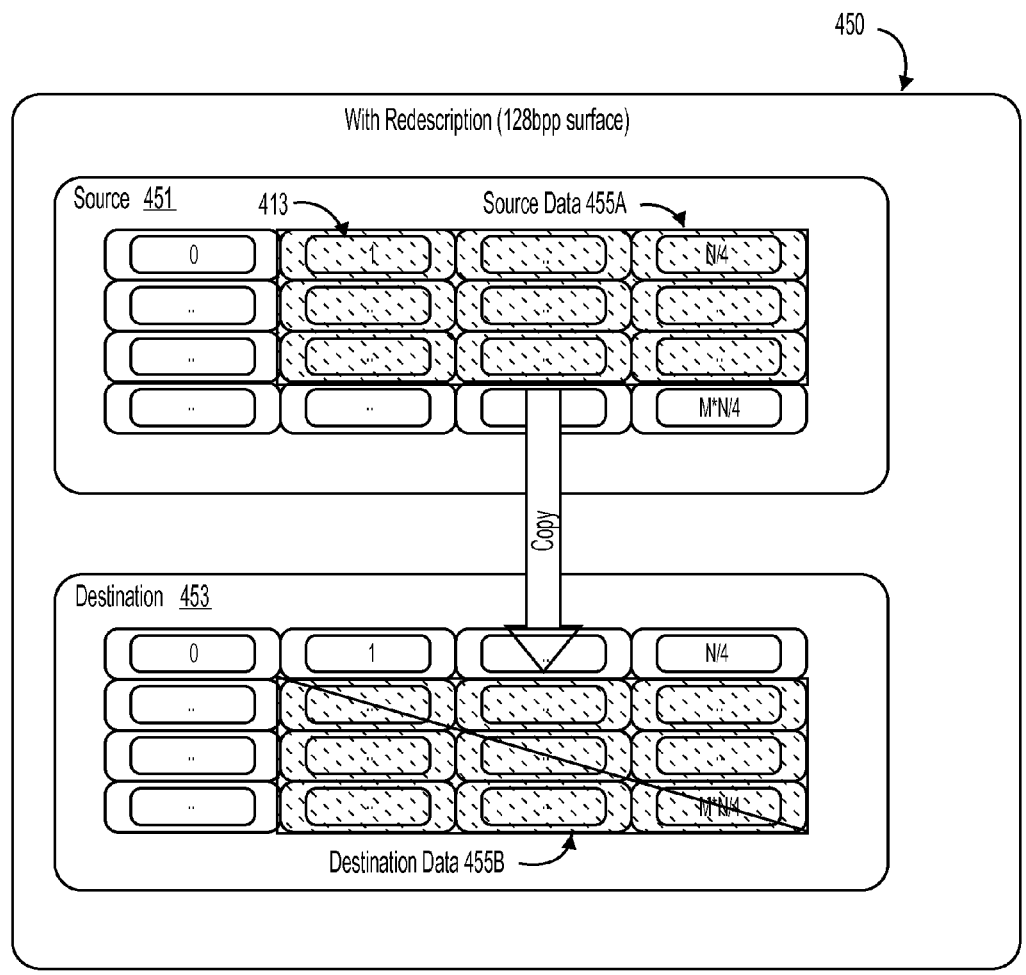

FIGS. 4A-4C illustrate copying of data as facilitated by a mechanism for improved copying of graphics data 110 of FIG. 1 according to one embodiment. As illustrated in FIG. 4C, in one embodiment, bits-based re-description technique 450 may be applied, such as re-describing a native bpp value (e.g., 32 bpp) into a threshold bpp value (e.g., 128 bpp), to efficiently process and copy source data 455A from source 451 as destination data 455B at destination 453 as facilitated by bits-based re-description logic 209 and other components of re-description engine 205 and copying mechanism 110 of FIG. 2.

Starting with FIG. 4A, it illustrates without/re-description technique for 400 copying data from a 2D source buffer at source 401 to a 2D destination buffer at source 403 which is based on a 32 bpp surface having source data 407A based on 32 bpp texels. As previously mentioned, it is to be noted that for brevity and clarity, 32 bpp and 128 bpp are merely used as examples of a native bpp value and a threshold bpp value, respectively, but that embodiments are not limited to any particular bpp value, including those mentioned here or any other bpp values. As illustrated, using without/re-description technique 400, source data 407A may be transferred to destination 403 as destination data 407B in smaller texels (e.g., 32 bpp texels) which requires a transfer of 36 32 bpp texels, as illustrated, and consequently, running of multiple programs to perform extensive and inefficient computations for reads and/or writes while consuming valuable time, power, cache, etc.

In one embodiment, FIG. 4B provides that any number of smaller texels may be combined into a number of larger texels and therefore, reducing the overall or total number of texels that are needed to transfer the same amount of data. For example and as illustrated, four 32 bpp texels 411A, 411B, 411C, 411D of source data 407A may be re-described or converted into a single 128 bpp texel 413. It is contemplated that just as embodiments are not limited to any particular native or threshold bpp value, they are also not limited to any number or size of native thresholds or any particular conversion formula involving any number or size of threshold texels, such as 4 texels into 1 texel, 2 texels into 1 texel, 8 texels into 1 texel, etc. Continuing with the example, in one embodiment, having performed the conversion process of FIG. 4B on all texels of source data 407A, its 36 32 bpp texels may be reduced by 25% to merely 9 128 bpp texels as illustrated in FIG. 4C.

In other words and as illustrated in FIG. 4C, using with/re-description technique 450 and in one embodiment, the same amount of source data, now source data 455A at source 451, may now be efficiently copied as destination data 455B from source 451 to destination 453 using merely 9 texels of 128 bpp (as opposed to 36 texels of 32 bpp). As further illustrated in FIG. 4C, four 32 bpp texels 411A-411D of source data 407A are now shown as a single 128 bpp texel 413 of source data 455A. This application of with/re-description technique 450 significantly reduces the use of processing time and resources as, for example, fewer instances of reads/writes are needed when fewer texels are copied.

In one embodiment, source data 455A from an aligned 128 bpp surface at source 451 is efficiently copied to another 128 bpp surface at destination 453 as destination data 455B using a single block primitive having all 9 128 bpp texels as is indicated by a diagonal line running across the entire block of destination data 455B. However, in some embodiments, where source and destination surfaces may be aligned to each other and/or hardware cache, but not to the threshold bpp value, such as 128 bpp, one or more additional primitives may be executed to serve as head primitive and/or tail primitive to help perform the necessary head and/or tail alignments at native bpp, such as 32 bpp, where the one or more primitives may include one or more texels of the native 32 bpp. Moreover, if source and destination surfaces, source and destination offsets, width of the primitives to be copied are a multiple of certain bits, such as 128 bits, then the source and destination formats may be re-described to a corresponding threshold bpp format, such as a 128 bpp format, as shown in FIG. 4B, to achieve a significant reduction in primitive size while enabling efficient copying of more data per clock.

Figure 4D:
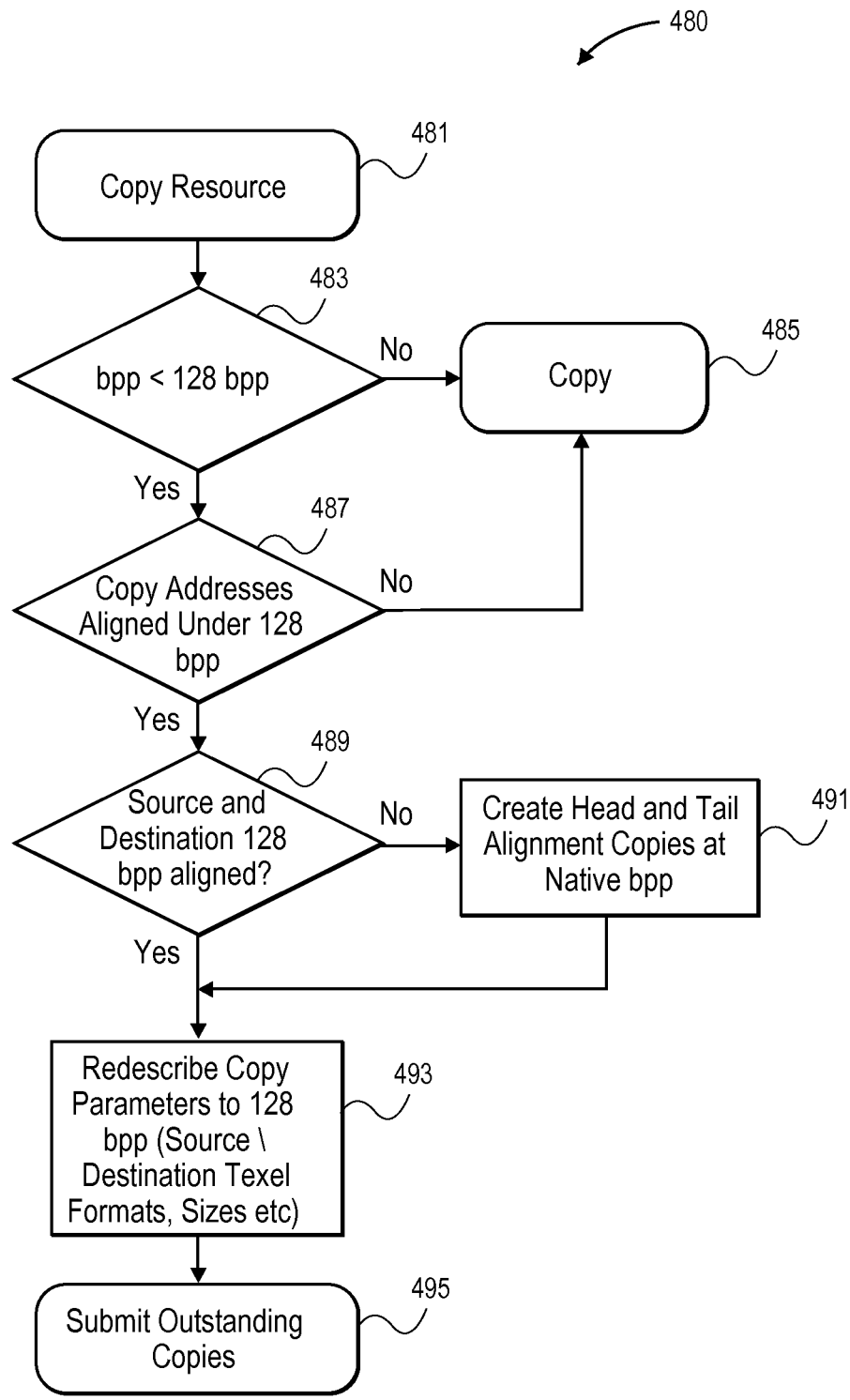
FIG. 4D illustrates a method for facilitating copying of data as illustrated in FIGS. 4A-4C using mechanism for improved copying of graphics data of FIG. 1 according to one embodiment.

FIG. 4D illustrates a method 480 for facilitating copying of data as illustrated in FIGS. 4A-4C using mechanism for improved copying of graphics data 110 of FIG. 1 according to one embodiment. Method 480 may be performed by processing logic that may comprise hardware (e.g., circuitry, dedicated logic, programmable logic, etc.), software (such as instructions run on a processing device), or a combination thereof. In one embodiment, method 480 may be performed by copying mechanism 110 of FIG. 1. The processes of method 480 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

Method 480 begins at block 481 with copying of a 2D buffer or resource. At block 483, in one embodiment, a determination is made as to whether the native bpp value of texels (e.g., 32 bpp) of the data in the buffer/resource is less than a threshold bpp value (e.g., 128 bpp). If the native bpp value is not less than the threshold bpp value, the data at the source is simply copied to an address at the destination at block 485. However, if the native bpp value is less than threshold bpp value, then at block 487, another determination is made as to whether the copy addresses are aligned with each other or with the hardware cache under the threshold bpp value. If they are not aligned, the data is simply copied to the destination at block 485.

However, if the copy addresses are aligned, then at block 489, another determination is made as to whether the source and destination are threshold bpp value, such as 128 bpp, aligned. If the source and destination are not threshold bpp value aligned, in one embodiment, a head primitive and/or a tail primitive are created using the native bpp, such as 32 bpp, at block 491. If the source and destination are aligned, then the process continues at block 493, where, in one embodiment, the copy parameters of the source data are re-described or converted from the native bpp value to the threshold bpp value, such converting 32 bpp texels into fewer but larger 128 bpp texels as illustrated in FIGS. 4B-4C. At block 495, the re-described source data, such as 128 bpp source data, having fewer re-described texels, such as 128 bpp texels, is copied as re-described destination data, such as 128 bpp destination data, at the destination.

Figure 5A:
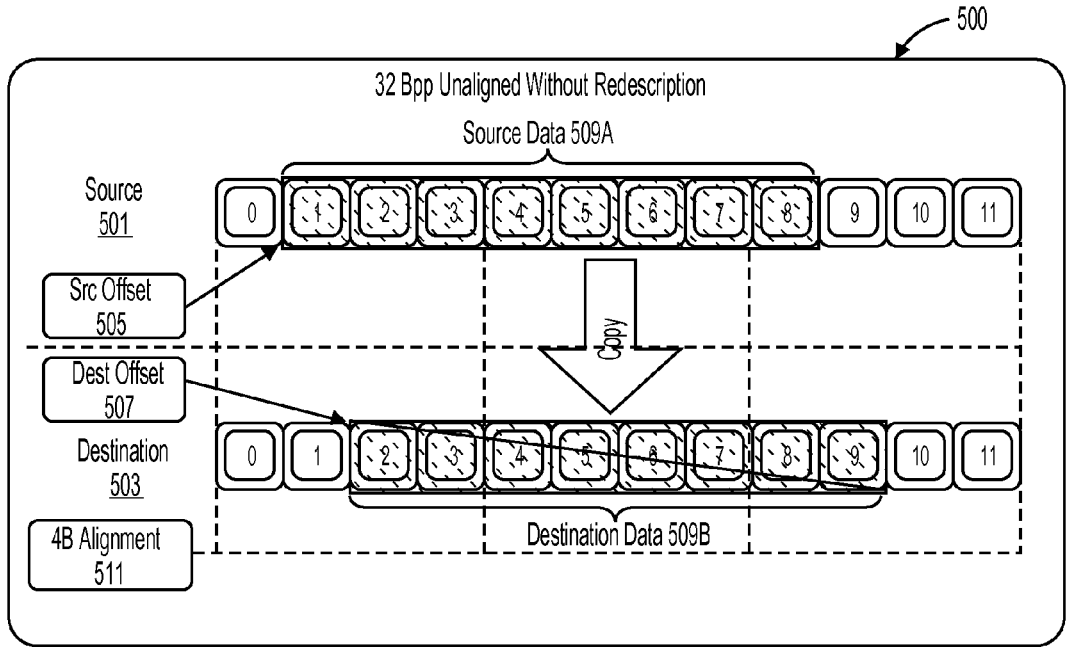
FIGS. 5A-5C illustrate copying of data as facilitated by a mechanism for improved copying of graphics data of FIG. 1 according to one embodiment.
Figure 5B:
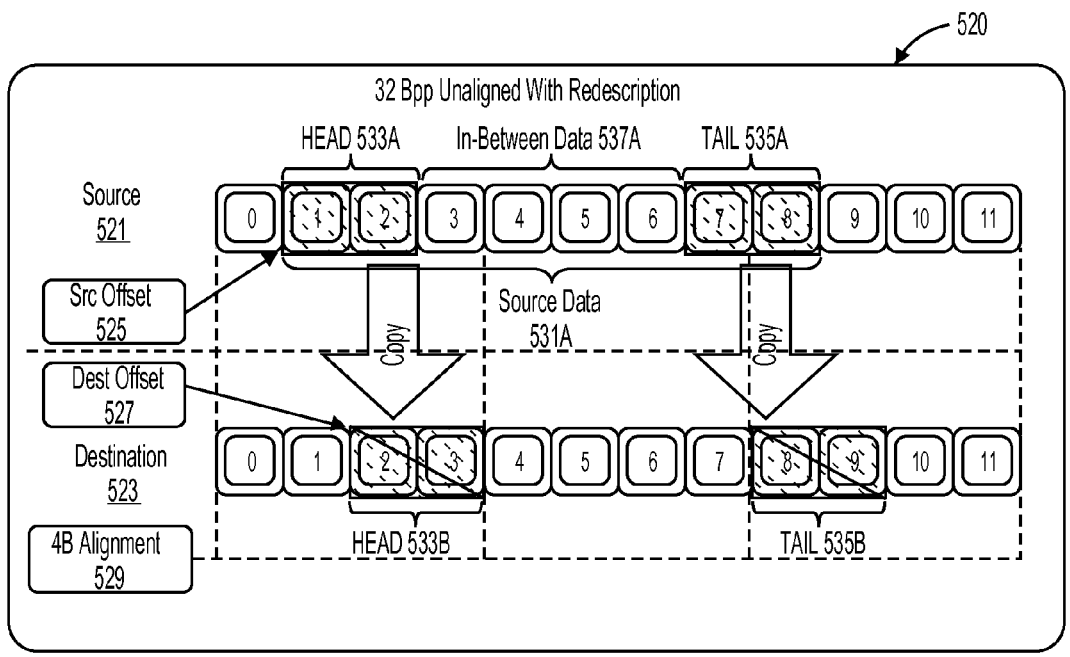
Figure 5C:
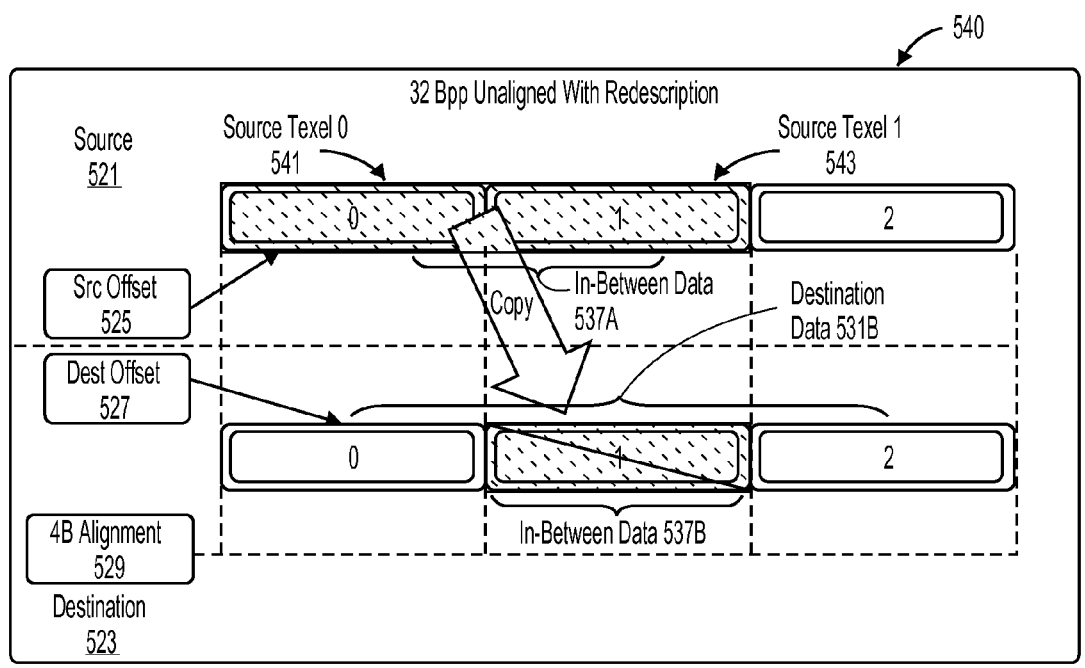

FIGS. 5A-5C illustrate copying of data as facilitated by a mechanism for improved copying of graphics data 110 of FIG. 1 according to one embodiment. As illustrated in FIG. 5A, source offset 505 of source data 509A to be copied from source 501 to destination 503 does not align with destination offset 507, where source offset 505 and destination offset 507 indicate initiation points in the corresponding buffers from where selecting of source data 509A and its copying into destination data 509B, respectively, is to be initiated. For example, as illustrated, source offset 505 begins from texel 1 at source 501, while destination offset 507 begins from texel 2 at destination 503 within a structure of 4B alignment 511. This illustrated unaligned copying of source data 509A into destination data 509B may be performed at native bpp value, such as 32 bpp, requiring, for example, 8 pixel shader invocations, 8 memory fetches, and 8 memory reads and writes.

In one embodiment, FIG. 5B illustrates copying of source data 531A as facilitated by unaligned bits-based logic 211 and other components of re-description engine 205 and mechanism for improved copying of graphics data 110 of FIG. 1. As discussed above, in one embodiment, unaligned bits-based re-description technique 520, 540 may be applied in two processes as illustrated FIGS. 5B and 5C. For example, using a structure of 4B alignment 529, as illustrated in FIG. 5B, source offset 525 and destination offset 527 are shown as unaligned with each other and accordingly, in one embodiment, source head alignment copy (also referred to as "head primitive" or simply "head") 533A and source tail alignment copy (also referred to as "tail primitive" or simply "tail") 535A of source data 531A are generated and copied as head 533B and tail 535B at destination offset 527 of destination 523. In one embodiment, source head 533A and source tail 535A may be copied as destination head 533B and destination tail 535B, respectively, using their native bpp (e.g., 32 bpp). In one embodiment, to further increase copy performance and efficiency, head alignment copy 533A and/or tail alignment copy 535A may be extended to a GPU cache-line boundary, eliminating all cache unaligned reads and/or writes during the block copy.

As further illustrated in FIG. 5B, source head 533A and source tail 535A of source data 531A at source 521 are conveniently and efficiently copied at destination 523 beginning at destination offset 527 as destination head 533B (representing destination texels 2-3) and destination tail 535B (representing destination texels 8-9) as primitives (as indicated by a diagonal line running across each of them). In the illustrated embodiment, a maximum of 4 pixel shader invocations, 4 memory fetches, and/or 4 memory read and/or writes may be processed.

Upon alignment and copying of head 533A-B and tail 535A-B, in one embodiment, the rest of source data 531A, such as in-between data 537A, may then be aligned and block copied to destination 523 as shown in FIG. 5C. In one embodiment, using the technique previously mentioned with regard to FIG. 4B, given 4B alignment 529, source texel 0 541 and source texel 1 543 are generated by converting four texels each of source data 531A. For example, 4 32 bpp texels 0-3 of source data 531A of FIG. 5B may be re-described or converted into a single 128 bpp source texel 0

541 of FIG. 5C. Similarly, 4 32 bpp texels 4-7 of source data 531A of FIG. 5B may be re-described or converted into a single 128 bpp source texel 1 543 of FIG. 5C.

It is to be noted that in-between data 537A represents the remaining data (e.g., texels 3-6) of source data 531A which is located between head 533A and tail 535A. In other words, with the newly-generated source texels 0 541 and 1 543, data relating to texel 3 is now part of source texel 0 541 while any data relating to texels 4-6 is now part of source texel 1 543. In one embodiment, using source texels 0 541 and 1 543, in-between data 537A is efficiently aligned and copied to destination 523 as in-between data 537B as part of destination data 531B and between the previously-copied head 533B and tail 535B. Accordingly, this copying of source in-between data 537A as destination in-between data 537B may need a maximum of merely a single pixel shader invocation, 2 memory fetches, and 1 memory write.

Although the block copy may use the same technique as previously mentioned with reference to FIG. 4B, a specialized shader, such as or facilitated by shading module 213 of FIG. 2, may also be used to read, manipulate, and write the correct portion (e.g., in-between data 537A) of source data 531A due to and in light of various surface alignment restrictions. For example, the specialized shader may read in a byte-shift value, perform two reads, swizzle the channels of the reads so that after a channel-wise and/or bit-wise shift, the resultants can be properly added and stored for producing the correct value. For example, two descriptions of the source surface may allow for easy handling of texel-addressing edge case scenarios by relying on one texture coordinate. Similarly, a forced aligner, such as or facilitated by forced alignment module 215 of FIG. 2, may be used to force the alignment between source offset 525 and destination offset 527 and their corresponding addresses of source 521 and destination 523. Further, as aforementioned, any processing or selection of data may be performed by selection and computation logic 217, while copying may be performed by copying logic 219 of FIG. 2.

Figure 5D:
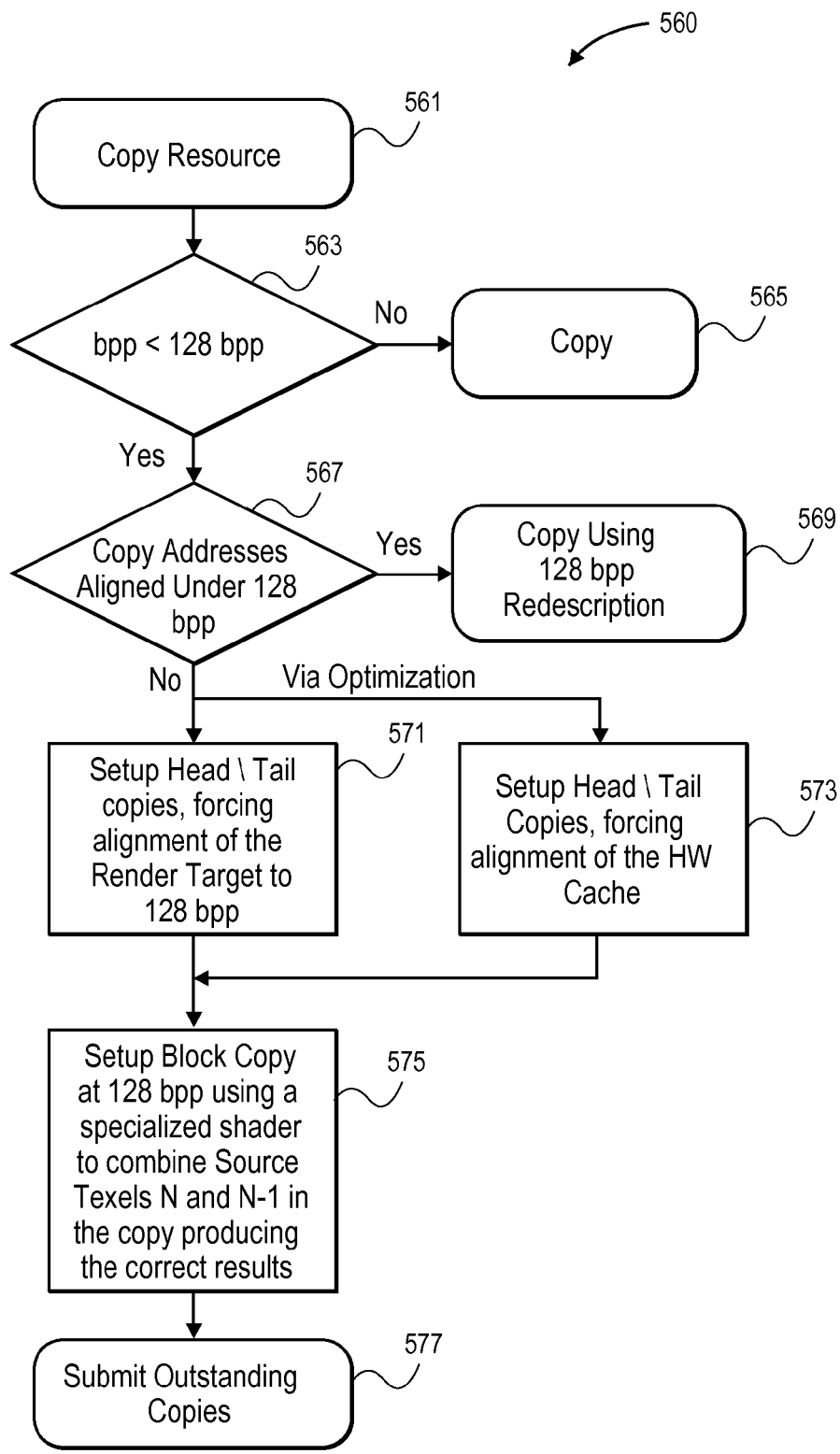
FIG. 5D illustrates a method for facilitating copying of data as illustrated in FIGS. 5A-5C using a mechanism for improved copying of graphics data of FIG. 1 according to one embodiment.

FIG. 5D illustrates a method 560 for facilitating copying of data as illustrated in FIGS. 5A-5C using a mechanism for improved copying of graphics data 110 of FIG. 1 according to one embodiment. Method 560 may be performed by processing logic that may comprise hardware (e.g., circuitry, dedicated logic, programmable logic, etc.), software (such as instructions run on a processing device), or a combination thereof. In one embodiment, method 560 may be performed by copying mechanism 110 of FIG. 1. The processes of method 560 are illustrated in linear sequences for brevity and clarity in presentation; however, it is contemplated that any number of them can be performed in parallel, asynchronously, or in different orders. For brevity, many of the details discussed with reference to the preceding Figures may not be discussed or repeated hereafter.

Method 560 may begin at block 561 with coping of a source buffer or resource. At block 563, a determination is made as to whether the native bpp value, such as 32 bpp, of the source buffer is less than a threshold bpp value, such as 128 bpp. It is contemplated that embodiments are not limited to any particular native and/or threshold bpp values, but for the sake of brevity, ease of understanding, and consistency with the previous examples, the native bpp value is assumed to be 32 bpp while the threshold bpp value is assumed to be 128 bpp. If the native bpp value is not less than the threshold bpp value, the source data may simply be copied to an address at a destination at block 565. If, however, the native bpp value is smaller than the threshold bpp value, another determination is made as to whether copy addresses (e.g., source address, destination address, etc.) are aligned under the threshold bpp value. If they are aligned, at block 569, copying of the source data may be facilitated using the bits-based with/re-description technique 450 as illustrated in FIGS. 4B-4C and 4D and facilitated by bits-based re-description logic 209 of FIG. 2.

If, however, the copy addresses are not aligned, in one embodiment, at block 571, head and/or tail copies are set up for force alignment of the copy addresses by rendering the target to the threshold bpp value, and/or, at block 573, head and/or tail copies are set up for force alignment of the hardware cache via optimization, such as the head and tail of the source data are copied at their corresponding addresses at the destination, forcing the alignment for the rest of the data. At block 575, in one embodiment, a block copy of the rest of the source data, such as in-between data 537A-B of FIG. 5C which is the remaining data located between the head and the tail, is set up at the threshold bpp value using a specialized shader to combine source texels N and N−1, such as source texels 0 541 and 1 543 of FIG. 5C, in a copy producing the correct results. At block 577, the rest of the data is copied from the address at the source to an address at the destination between the previously-copied head and tail.

FIG. 6 illustrates an embodiment of a computing system 600. Computing system 600 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 600 may be the same as or similar to or include computing device 100 of FIG. 1

Certain functionalities of a graphics pipeline are implemented in hardware, and certain functionalities are implemented in software. A graphics pipeline may be implemented in a graphics coprocessor design, where a CPU chip is designed to work with a graphics coprocessor 610 (graphics processing unit (GPU)). In embodiment, graphics coprocessor 610 employs any number of conventional software and hardware logic to perform the conventional functions relating to graphics rendering as well as a number of novel software and hardware logic 614 to perform the novel functions for graphics rendering as disclosed throughout this document. For example, graphics coprocessor 610 may host mechanism for improved copying of graphics data 110 of FIG. 1.

A random access memory (RAM) 606 comprises application database having object information. A memory controller 604 accesses data in RAM 606 and forwards to a CPU 602 for graphics pipeline processing. RAM 606 may include double data rate RAM (DDR RAM), extended data output RAM (EDO RAM) etc. CPU 602 interacts with a hardware graphics pipeline 614 to share graphics pipelining functionality. Processed data is stored in a buffer in the hardware graphics pipeline 614, and state information is stored in memory 608. The resulting image is then transferred to a display 612. Alternatively, a graphics controller on the same die as a CPU 602, and sharing the cache and memory controller may be used. Display 612 may be of various types, such as Cathode Ray Tube (CRT), Thin Film Transistor (TFT), Liquid Crystal Display (LCD), DPL, Organic Light Emitting Diode (OLED) array, etc., to display information to a user.

In one embodiment, some processes of the graphics pipeline as described above are implemented in software, while the rest are implemented in hardware. Memory 208 may comprise a pre-allocated region of a buffer (e.g., frame buffer); however, it should be understood by one of ordinary skill in the art that the embodiments are not so limited, and that any memory accessible to the lower graphics pipeline may be used. Computer system 600 may further includes an input/output (I/O) control hub (ICH), one or more I/O devices, etc.

CPU 602 may include one or more processors to execute instructions in order to perform whatever software routines the computing system implements. The instructions frequently involve some sort of operation performed upon data. Both data and instructions are stored in system memory 608 and any associated cache. Cache is typically designed to have shorter latency times than system memory 608; for example, cache might be integrated onto the same silicon chip(s) as the processor(s) and/or constructed with faster static RAM (SRAM) cells whilst the system memory 608 might be constructed with slower dynamic RAM (DRAM) cells. By tending to store more frequently used instructions and data in the cache as opposed to the system memory 608, the overall performance efficiency of the computing system 600 improves. It is contemplated that in some embodiments, GPU 610 may exist as part of CPU 602 (such as part of a physical CPU package) in which case, memory 608 may be shared between CPU 602 and GPU 610 and not be separated as illustrated in this embodiment.

System memory 608 is deliberately made available to other components within the computing system 600. For example, the data (e.g., input graphics data) received from various interfaces to the computing system 600 (e.g., keyboard and mouse, printer port, Local Area Network (LAN) port, modem port, etc.) or retrieved from an internal storage element of the computer system 600 (e.g., hard disk drive) are often temporarily queued into system memory 608 prior to their being operated upon by the one or more processor(s) in the implementation of a software program. Similarly, data that a software program determines should be sent from the computing system 600 to an outside entity through one of the computing system interfaces, or stored into an internal storage element, is often temporarily queued in system memory 608 prior to its being transmitted or stored.

An ICH may be used for ensuring that such data is properly passed between the system memory 608 and its appropriate corresponding computing system interface (and internal storage device if the computing system is so designed) and may have bi-directional point-to-point links between itself and the observed I/O devices. Memory controller 604 may be used for managing the various contending requests for system memory 608 accesses amongst the CPU 602, interfaces and internal storage elements that may proximately arise in time with respect to one another.

One or more I/O devices are also implemented for transferring data to and/or from the computing system 600 (e.g., a networking adapter); or, for large scale non-volatile storage within the computing system 600 (e.g., hard disk drive). User input device, including alphanumeric and other keys, may be used to communicate information and command selections to processor 610. Another type of user input device is cursor control, such as a mouse, a trackball, a touchscreen, a touchpad, or cursor direction keys to communicate direction information and command selections to processor 610 and to control cursor movement on display 612. Camera and microphone arrays of computer system 600 may be employed to observe gestures, record audio and video and to receive and transmit visual and audio commands.

Computing system 600 may further include network interface(s) to provide access to a network, such as a local area network (LAN), a wide area network (WAN), a metropolitan area network (MAN), a personal area network (PAN), Bluetooth, a cloud network, a mobile network (e.g., $3^{rd}$ Generation (3G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the foregoing specification, embodiments have been described with reference to specific exemplary embodiments thereof. It will, however, be evident that various modifications and changes may be made thereto without departing from the broader spirit and scope of embodiments as set forth in the appended claims. The Specification and drawings are, accordingly, to be regarded in an illustrative rather than a restrictive sense.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes an apparatus to facilitate improved copying of graphics data on computing devices, comprising: detection logic to detect a first data having a first set of primitives at a one-dimensional ("1D") source buffer, wherein the first data is detected to be copied to a 1D destination buffer; dimension-based re-description logic to re-describe the 1D source buffer and the 1D destination buffer into a two-dimensional ("2D") source buffer and a 2D destination buffer, respectively, wherein the re-description logic is further to re-describe the first data having the first set of primitives to a second data having a second set of primitives; and copying logic to copy the second data having the second set of primitives from the 2D source buffer to the 2D destination buffer.

Example 2 includes the subject matter of Example 1, further comprising: selection and computation logic to compute a number of bytes of the second data to form multiple primitives of the second set of primitives, wherein a remainder byte is regarded a tail primitive, wherein the selection and computation logic is further to select the second set of primitives and the tail primitive for copying to the 2D destination buffer.

Example 3 includes the subject matter of Example 2, wherein copying further includes copying the tail primitive to the 2D destination buffer.

Example 4 includes the subject matter of Example 1, further comprising: evaluation logic to evaluate the first data, and forward the first data to the dimension-based re-description logic for further processing of the first data.

Example 5 includes the subject matter of Example 4, wherein the evaluation logic is further to evaluate the first data, and forward the first data to bits-based re-description logic or unaligned bits-based re-description logic for further processing of the first data.

Example 6 includes the subject matter of Example 5, wherein the bits-based re-description logic to re-describe the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

Example 7 includes the subject matter of Example 6, wherein the copying logic is further to copy the third data having the reduced set of texels from a source address to a destination address.

Example 8 includes the subject matter of Example 5, wherein the unaligned bits-based re-description logic to: generate a head primitive having a first portion of the first data; generate a tail primitive having a second portion of the first data; shade, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and adjust, via a forced adjustment module, an alignment between a source address and a destination address.

Example 9 includes the subject matter of Example 8, wherein the copying logic is further to copy the head primitive, the tail primitive, and the remainder of the first data from the source address to the destination address.

Some embodiments pertain to Example 10 that includes a method for facilitating improved copying of graphics data on computing devices, comprising: detecting a first data having a first set of primitives at a one-dimensional ("1D") source buffer, wherein the first data is detected to be copied to a 1D destination buffer; re-describing the 1D source buffer and the 1D destination buffer into a two-dimensional ("2D") source buffer and a 2D destination buffer, respectively, wherein re-describing includes re-describing the first data having the first set of primitives to a second data having a second set of primitives; and copying the second data having the second set of primitives from the 2D source buffer to the 2D destination buffer.

Example 11 includes the subject matter of Example 10, further comprising: computing a number of bytes of the second data to form multiple primitives of the second set of primitives, wherein a remainder byte is regarded a tail primitive; and selecting the second set of primitives and the tail primitive for copying to the 2D destination buffer.

Example 12 includes the subject matter of Example 11, wherein copying further includes copying the tail primitive to the 2D destination buffer.

Example 13 includes the subject matter of Example 10, further comprising: evaluating the first data, and forwarding the first data to the dimension-based re-description logic for further processing of the first data.

Example 14 includes the subject matter of Example 10, further comprising: re-describing the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

Example 15 includes the subject matter of Example 14, further comprising: copying the third data having the reduced set of texels from a source address to a destination address.

Example 16 includes the subject matter of Example 10, further comprising: generating a head primitive having a first portion of the first data; generating a tail primitive having a second portion of the first data; shading, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and adjusting, via a forced adjustment module, an alignment between a source address and a destination address.

Example 17 includes the subject matter of Example 10, further comprising: copying the head primitive, the tail primitive, and the remainder of the first data from the source address to the destination address.

Example 18 includes at least one machine-readable medium comprising a plurality of instructions, when executed on a computing device, to implement or perform a method or realize an apparatus as claimed in any preceding claims.

Example 19 includes at least one non-transitory or tangible machine-readable medium comprising a plurality of instructions, when executed on a computing device, to implement or perform a method or realize an apparatus as claimed in any preceding claims.

Example 20 includes a system comprising a mechanism to implement or perform a method or realize an apparatus as claimed in any preceding claims.

Example 21 includes an apparatus comprising means to perform a method as claimed in any preceding claims.

Example 22 includes a computing device arranged to implement or perform a method or realize an apparatus as claimed in any preceding claims.

Example 23 includes a communications device arranged to implement or perform a method or realize an apparatus as claimed in any preceding claims.

Some embodiments pertain to Example 24 includes a system comprising a storage device having instructions, and a processor to execute the instructions to facilitate a mechanism to perform one or more operations comprising: detecting a first data having a first set of primitives at a one-dimensional ("1D") source buffer, wherein the first data is detected to be copied to a 1D destination buffer; re-describing the 1D source buffer and the 1D destination buffer into a two-dimensional ("2D") source buffer and a 2D destination buffer, respectively, wherein re-describing includes re-describing the first data having the first set of primitives to a second data having a second set of primitives; and copying the second data having the second set of primitives from the 2D source buffer to the 2D destination buffer.

Example 25 includes the subject matter of Example 24, wherein the one or more operations further comprise: computing a number of bytes of the second data to form multiple primitives of the second set of primitives, wherein a remainder byte is regarded a tail primitive; and selecting the second set of primitives and the tail primitive for copying to the 2D destination buffer.

Example 26 includes the subject matter of Example 25, wherein copying further includes copying the tail primitive to the 2D destination buffer.

Example 27 includes the subject matter of Example 24, wherein the one or more operations further comprise: evaluating the first data, and forwarding the first data to the dimension-based re-description logic for further processing of the first data.

Example 28 includes the subject matter of Example 24, wherein the one or more operations further comprise: re-describing the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

Example 29 includes the subject matter of Example 28, wherein the one or more operations further comprise: copying the third data having the reduced set of texels from a source address to a destination address.

Example 30 includes the subject matter of Example 24, wherein the one or more operations further comprise: generating a head primitive having a first portion of the first data; generating a tail primitive having a second portion of the first data; shading, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and adjusting, via a forced adjustment module, an alignment between a source address and a destination address.

Example 31 includes the subject matter of Example 30, wherein the one or more operations further comprise: copying the head primitive, the tail primitive, and the remainder of the first data from the source address to the destination address.

Some embodiments pertain to Example 32 includes an apparatus comprising: means for detecting a first data having a first set of primitives at a one-dimensional ("1D") source buffer, wherein the first data is detected to be copied to a 1D destination buffer; means for re-describing the 1D source buffer and the 1D destination buffer into a two-dimensional ("2D") source buffer and a 2D destination buffer, respectively, wherein re-describing includes re-describing the first data having the first set of primitives to a second data having a second set of primitives; and means for copying the second data having the second set of primitives from the 2D source buffer to the 2D destination buffer.

Example 33 includes the subject matter of Example 32, further comprising: means for computing a number of bytes of the second data to form multiple primitives of the second set of primitives, wherein a remainder byte is regarded a tail primitive; and means for selecting the second set of primitives and the tail primitive for copying to the 2D destination buffer.

Example 34 includes the subject matter of Example 33, wherein copying further includes copying the tail primitive to the 2D destination buffer.

Example 35 includes the subject matter of Example 32, further comprising: means for evaluating the first data, and means for forwarding the first data to the dimension-based re-description logic for further processing of the first data.

Example 36 includes the subject matter of Example 32, further comprising: means for re-describing the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

Example 37 includes the subject matter of Example 36, further comprising: means for copying the third data having the reduced set of texels from a source address to a destination address.

Example 38 includes the subject matter of Example 32, further comprising: means for generating a head primitive having a first portion of the first data; means for generating a tail primitive having a second portion of the first data; shading, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and means for adjusting, via a forced adjustment module, an alignment between a source address and a destination address.

Example 39 includes the subject matter of Example 38, further comprising: means for copying the head primitive, the tail primitive, and the remainder of the first data from the source address to the destination address.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
   a hardware processing device coupled to memory, the hardware processing device facilitates:
   detection logic to detect a first data having a first set of primitives at a one-dimensional ("1D") source buffer, wherein the first data is detected to be copied to a 1D destination buffer;
   dimension-based re-description logic to re-describe the 1D source buffer and the 1D destination buffer into a two-dimensional ("2D") source buffer and a 2D destination buffer, respectively, wherein the re-description logic is further to re-describe the first data having the first set of primitives to a second data having a second set of primitives;
   copying logic to copy the second data having the second set of primitives from the 2D source buffer to the 2D destination buffer; and
   selection and computation logic to compute a number of bytes of the second data to form multiple primitives of the second set of primitives, wherein a remainder byte is regarded a tail primitive, wherein the selection and computation logic is further to select the second set of primitives and the tail primitive for copying to the 2D destination buffer.

2. The apparatus of claim 1, wherein the hardware processing device facilitates copying to include copying the tail primitive to the 2D destination buffer.

3. The apparatus of claim 1, wherein the hardware processing device facilitates:
   evaluation logic to evaluate the first data, and forward the first data to the dimension-based re-description logic for further processing of the first data.

4. The apparatus of claim 3, wherein the hardware processing device further facilitates the evaluation logic to evaluate the first data, and forward the first data to bits-based re-description logic or unaligned bits-based re-description logic for further processing of the first data.

5. The apparatus of claim 4, wherein the hardware processing device facilitates the bits-based re-description logic to re-describe the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

6. The apparatus of claim 5, wherein the hardware processing device further facilitates the copying logic to copy the third data having the reduced set of texels from a source address to a destination address.

7. The apparatus of claim 4, wherein the hardware processing device further facilitates the unaligned bits-based re-description logic to:
   generate a head primitive having a first portion of the first data;
   generate a tail primitive having a second portion of the first data;
   shade, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and
   adjust, via a forced adjustment module, an alignment between a source address and a destination address.

8. The apparatus of claim 7, wherein the hardware processing device further facilitates the copying logic to copy the head primitive, the tail primitive, and the remainder of the first data from the source address to the destination address, wherein the hardware processing device comprises one or more of one or more graphics processors, one or more application processors, one or more microchips, and one or more integrated circuits.

9. A method comprising:
detecting a first data having a first set of primitives at a one-dimensional ("1D") source buffer, wherein the first data is detected to be copied to a 1D destination buffer;
re-describing the 1D source buffer and the 1D destination buffer into a two-dimensional ("2D") source buffer and a 2D destination buffer, respectively, wherein re-describing includes re-describing the first data having the first set of primitives to a second data having a second set of primitives;
copying the second data having the second set of primitives from the 2D source buffer to the 2D destination buffer;
computing a number of bytes of the second data to form multiple primitives of the second set of primitives, wherein a remainder byte is regarded a tail primitive; and
selecting the second set of primitives and the tail primitive for copying to the 2D destination buffer.

10. The method of claim 9, wherein copying further includes copying the tail primitive to the 2D destination buffer.

11. The method of claim 9, further comprising evaluating the first data, and forwarding the first data to the dimension-based re-description logic for further processing of the first data.

12. The method of claim 9, further comprising re-describing the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

13. The method of claim 12, further comprising copying the third data having the reduced set of texels from a source address to a destination address.

14. The method of claim 9, further comprising:
generating a head primitive having a first portion of the first data;
generating a tail primitive having a second portion of the first data;
shading, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and
adjusting, via a forced adjustment module, an alignment between a source address and a destination address.

15. The method of claim 14, further comprising copying the head primitive, the tail primitive, and the remainder of the first data from the source address to the destination address.

16. At least one non-transitory machine-readable medium comprising a plurality of instructions that in response to being executed on a computing device, causes the computing device to carry out one or more operations comprising:
detecting a copy instruction to facilitate copying of a first data from a one-dimensional ("1D") source buffer to a 1D destination buffer, wherein the first data includes a first set of primitives;
re-describing the 1D source buffer and the 1D destination buffer into a two-dimensional ("2D") source buffer and a 2D destination buffer, respectively, wherein re-describing includes re-describing the first data having the first set of primitives to a second data having a second set of primitives;
copying the second data having the second set of primitives from the 2D source buffer to the 2D destination buffer;
computing a number of bytes of the second data to form multiple primitives of the second set of primitives, wherein a remainder byte is regarded a tail primitive; and
selecting the second set of primitives and the tail primitive for copying to the 2D destination buffer.

17. The non-transitory machine-readable medium of claim 16, wherein copying further includes copying the tail primitive to the 2D destination buffer.

18. The non-transitory machine-readable medium of claim 16, wherein the one or more operations further comprise evaluating the first data, and forwarding the first data to the dimension-based re-description logic for further processing of the first data.

19. The non-transitory machine-readable medium of claim 16, wherein the one or more operations further comprise re-describing the first data having an original set of texels into a third data having a reduced set of texels, wherein each texel includes one or more bytes, wherein a texel of the original set of texels includes 32 bits per pixel ("bpp") and wherein a texel of the reduced set of texels includes 128 bpp.

20. The non-transitory machine-readable medium of claim 19, wherein the one or more operations further comprise copying the third data having the reduced set of texels from a source address to a destination address.

21. The non-transitory machine-readable medium of claim 16, wherein the one or more operations further comprise:
generating a head primitive having a first portion of the first data;
generating a tail primitive having a second portion of the first data;
shading, via a shading module, the first data having a third portion indicating a remainder of the first data, where shading includes re-describing a first number of texels of the first data into a second number of texels, wherein a texel of the first number of texels includes 32 bpp and wherein a texel of the second set of texels includes 128 bpp; and
adjusting, via a forced adjustment module, an alignment between a source address and a destination address.

22. The non-transitory machine-readable medium of claim 21, wherein the one or more operations further comprise copying the head primitive, the tail primitive, and the remainder of the first data from the source address to the destination address.

* * * * *